(12) United States Patent
Sai (10) Patent No.: US 11,630,082 B2
(45) Date of Patent: Apr. 18, 2023

(54) MILLIMETER-WAVE AND ULTRASOUND SENSORS

(71) Applicant: Honeywell International Inc., Morris Plains, NJ (US)

(72) Inventor: Bin Sai, The Hague (NL)

(73) Assignee: Honeywell International Inc., Charlotte, NC (US)

(*) Notice: Subject to any disclaimer, the term of this patent is extended or adjusted under 35 U.S.C. 154(b) by 195 days.

(21) Appl. No.: 17/226,489

(22) Filed: Apr. 9, 2021

(65) Prior Publication Data

US 2021/0356431 A1    Nov. 18, 2021

Related U.S. Application Data

(60) Provisional application No. 63/024,690, filed on May 14, 2020.

(51) Int. Cl.
| | |
|---|---|
| *G01N 29/02* | (2006.01) |
| *G01K 13/02* | (2021.01) |
| *G01N 35/00* | (2006.01) |

(52) U.S. Cl.
CPC .......... *G01N 29/02* (2013.01); *G01K 13/026* (2021.01); *G01N 35/00871* (2013.01);
(Continued)

(58) Field of Classification Search
CPC ............. G01N 29/02; G01N 35/00871; G01N 2035/00881; G01N 2291/02836;
(Continued)

(56) References Cited

U.S. PATENT DOCUMENTS

| | | | |
|---|---|---|---|
| 8,494,788 B2 * | 7/2013 | Atkinson ................. | G01F 1/74 702/50 |
| 10,114,000 B1 | 10/2018 | Lewis et al. | |
| 2019/0257811 A1 | 8/2019 | Lewis et al. | |

FOREIGN PATENT DOCUMENTS

| | | |
|---|---|---|
| EP | 3545269 A1 | 10/2019 |
| WO | 2004/063741 A8 | 5/2005 |

(Continued)

OTHER PUBLICATIONS

Indian Examination Report dated Feb. 25, 2022 issued in connection with corresponding Indian Application No. 202114020039 (6 pages total).

*Primary Examiner* — Tarun Sinha
(74) *Attorney, Agent, or Firm* — John Maldjian; Stevens & Lee PC (57) ABSTRACT

A fluid mixture parameter determination (FMPD) system for analyzing a fluid mixture while moving includes a computing system and at least one material model that includes two or more model parameters for a plurality of material compositions stored in the memory. An ultrasonic sensor and a millimeter wave (MMW) sensor are each coupled to sense the fluid mixture and are coupled to the computing system. The ultrasonic sensor is for providing ultrasonic data to the computing system including a velocity of the fluid mixture or a volumetric flow, and a velocity of sound (VoS) through the fluid mixture. The MMW sensor is for providing MMW velocity data to the computing system. The computing system is for utilizing the material model together with the ultrasonic data and the MMW velocity data for identifying parameters including a plurality of components in the fluid mixture and a concentration for the plurality of components.

17 Claims, 5 Drawing Sheets

(52) U.S. Cl.
CPC ............ *G01N 2035/00881* (2013.01); *G01N 2291/02836* (2013.01); *G01N 2291/02872* (2013.01); *G01N 2291/02881* (2013.01)

(58) Field of Classification Search
CPC .......... G01N 2291/02872; G01N 2291/02881; G01N 2291/0215; G01N 2291/02809; G01N 29/4472; G01N 29/024; G01N 22/00; G01K 13/026; G01F 15/02; G01F 1/74; G01F 1/668; G01F 1/667; G01D 21/02
See application file for complete search history.

(56) References Cited

FOREIGN PATENT DOCUMENTS

| | | |
|---|---|---|
| WO | WO/2009/088437 | 7/2009 |
| WO | 2018/0955562 A1 | 5/2018 |

* cited by examiner

MATERIAL COMPOSITION PROPERTIES FOR NG

| COMPOSITION SUBSTANCE | SYMBOL | MOLAR MASS (g/mol) | RELATIVE PERMITTIVITY - RP | TYPICAL MOLE PERCENTAGE IN NG |
|---|---|---|---|---|
| METHANE | CH4 | 16.05 | 1.68 | 79.78% |
| ETHANE | C2H6 | 30.07 | 1.94 | 5.00% |
| PROPANE | C3H8 | 44.1 | 1.67 | 2.00% |
| BUTANE | C4H10 | 58.12 | 1.77 | 1.00% |
| PENTANE | C5H12 | 72.15 | 1.84 | 0.50% |
| HEXANE | C6H14 | 86.2 | 1.89 | 0.30% |
| HEPTANE | C7H16 | 100.2 | 1.92 | 0.10% |
| HYDROGEN | H2 | 2.01 | 1.28 | 10.00% |
| CARBON DIOXIDE | CO2 | 44.01 | 1.45 | 0.30% |
| NITROGEN | N2 | 28.02 | 1.47 | 1.00% |
| HYDROGEN SULFIDE | H2S | 34.09 | 5.93 | 0.02% |
| OCTANE | C8H18 | 115.23 | 1.95 | |
| WATER | H2O | 18.02 | 80 | |
| ETHANOL | C5H6O | 46.07 | 24.5 | |
| METHANOL | CH3OH | 32.4 | 32.7 | |
| AMMONIA | NH3 | 17.03 | 17 | |

MILLIMETER-WAVE AND ULTRASOUND SENSORS

CROSS REFERENCE TO RELATED APPLICATIONS

This application claims the benefit of Provisional Application Ser. No. 63/024,690 entitled "FLUID PARAMETER DETERMINATION USING MILLIMETER-WAVE AND ULTRASOUND SENSORS", filed May 14, 2020, which is herein incorporated by reference in its entirety.

FIELD

This Disclosure relates to parameter determination systems for a fluid mixture.

BACKGROUND

Natural gas is a mixture of gases comprising primarily methane ($CH_4$) as well as gas molecules having a higher number of carbon atoms, generally comprising 2 to 8 carbon, such as ethane, propane, and butane. Other gases are generally also included in natural gas, such as nitrogen, carbon dioxide, hydrogen sulfide, and helium. Natural gas can also include a variety of contaminants, such as sand, water, and oil. At this initial unrefined stage, the natural gas is generally referred to as being 'well head quality' or 'raw' natural gas.

There is an increasing interest and need in mid-market segments for inline real-time quality inspection and monitoring for fluid mixtures while the fluid is flowing, such as natural gas flowing in a pipeline. The composition of gas transported through a pipeline or by liquefied natural gas (LNG) stored in ships is conventionally determined by gas chromatography (GC).

GC is an analytical technique used to determine the composition of materials that include more than one composition component, such as in the case of natural gas to enable calculating its energy content. A conventional GC requires a heater and a pressure regulator inside the instrument to process the samples. In North America, the energy content is generally reported as British thermal units (BTUs). The higher the BTU rating, the more valuable the fuel is, and thus the higher the price that the fuel commands. An analysis of the composition of natural gas is thus needed for natural gas producers, distributors, utilities, gas engine and appliance manufacturers, and consumers.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize conventional gas chromatographs for analyzing the composition of fluid mixtures such as natural gas can be too expensive and too complex for small gas gate stations and distribution customers to purchase and implement. Disclosed aspects include a relatively low-cost fluid mixture parameter determination (FMPD) system configured for inline (real-time) measurements, where the FMPD system comprises at least a millimeter wave (MMW) sensor and an ultrasound sensor each providing sensor data to a computing system that includes at least one material model. The computing system uses the respective sensor data together with the material model(s) to determine a plurality of parameters for the fluid mixture while the fluid mixture is moving. The parameters determined include the various compositions present in the fluid mixture and their respective concentrations, the volumetric flow rate, and the velocity of sound (VoS), and optionally other parameters such as the fluid density, the humidity, the mass flow rate, the temperature, and the pressure.

DETAILED DESCRIPTION

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Figure 1A:
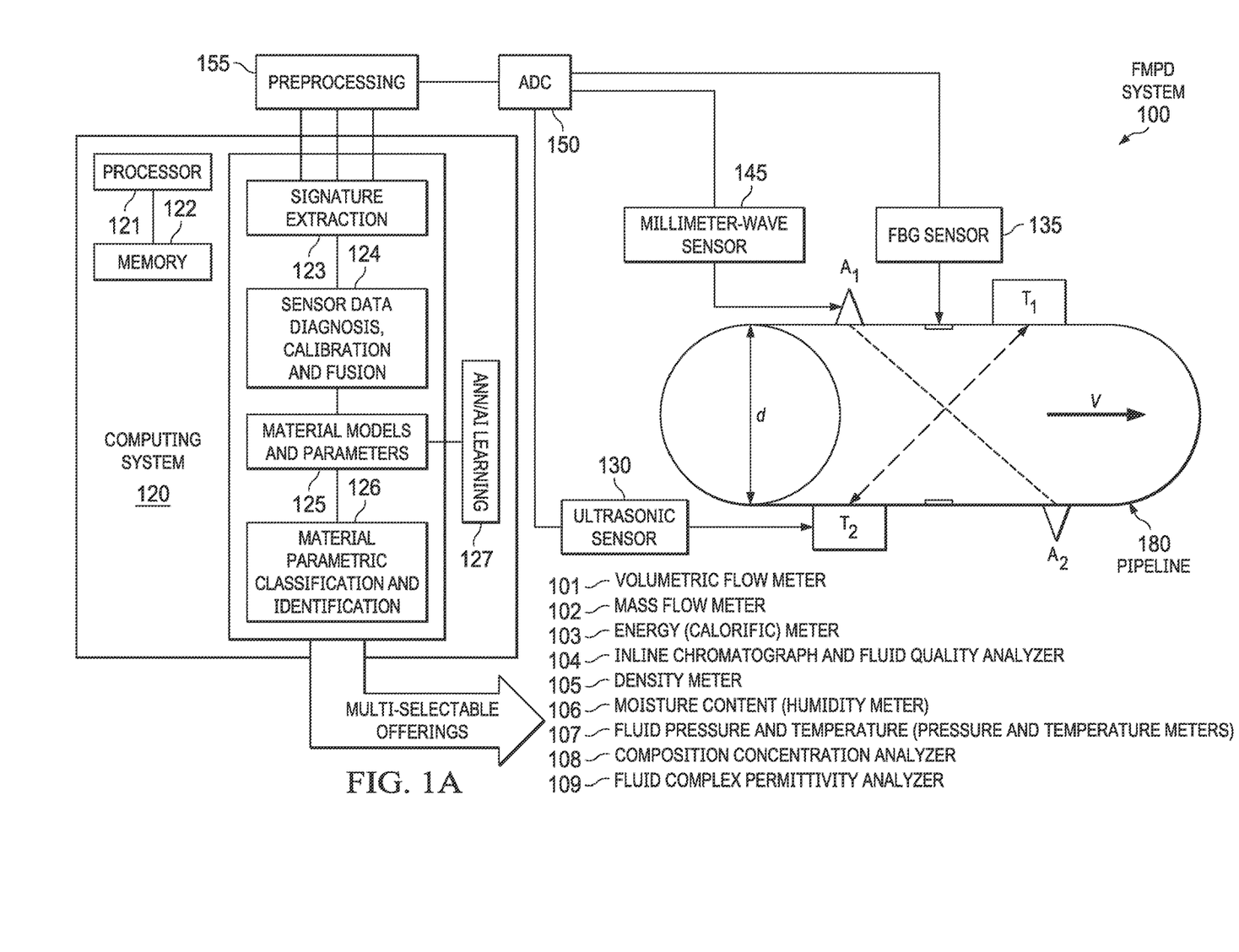
FIG. 1A shows a simplified depiction of an example FMPD system, according to an example aspect.

FIG. 1A shows a simplified depiction of an example FMPD system 100 mounted on a pipeline 180 for determining a plurality of parameters of a fluid mixture while it is moving through the pipeline 180, according to an example aspect. The pipeline 180 is shown having a diameter d (that defines its cross-sectional area) that has the fluid mixture therein, which is shown flowing from left to right at a velocity shown as V. The FMPD system 100 is adapted for in-line (real-time) monitoring of a plurality of parameters for the fluid mixture while it is moving. The FMPD system 100 can be considered a "super meter" because it implements the function of seven different meters all listed in FIG. 1A, and generally also has firmware that enables any of these functions and features to be enabled or disabled by an operator of the FMPD system 100.

These meters are shown as a volumetric flow meter 101, a mass flow meter 102, an energy (caloric) meter 103, an in-line chromatograph and fluid quality analyzer 104, a density meter 105, a moisture content meter 106 (providing a humidity measurement), and a fluid pressure and temperature meter 107. The computing system 120 of the FMPD system 100 is also shown providing analyzers including a composition concentration analyzer 108 and a fluid complex permittivity analyzer 109.

The FMPD system 100 comprises an MMW sensor 145, and an ultrasonic sensor 130 shown having a pair of transducers $T_1$ and $T_2$. Although the ultrasonic sensor 130 is shown having a single pair of transducers, there can be more than 1 pair of transducers. Also shown is an optional Fiber Bragg Grating (FBG) sensor 135 represented by the rectangles shown positioned on an inside surface of the pipeline 180 that are across from one another. The FBG sensor 135 can be implemented in various ways, where the FBG sensor's 135 array of sensor elements are typically mounted on optical fiber stripe that can be mounted along an inner circumference of the pipeline 180. All of these sensors 145, 135, 130 are shown having a transmitting, receiving and a sensing feature, and are each attached to the pipeline 180 for performing their respective sensing functions. There is also shown a pressure sensor 170 and a temperature sensor 175 attached to the pipeline 180 for performing their respective sensing functions.

The computing system 120 comprises a processor 121 and at least one associated memory 122. The computing system 120 is shown implementing a signature extraction block 123, a sensor data diagnosis, calibration, and fusion block 124, a material models and parameters block 125, and a material parametric classification and identification block 126. The computing system 120 also implements an ANN engine or an artificial intelligence (AI) engine, shown as an ANN/AI learning block 127, that is shown coupled to the material parametric classification and identification block 126.

The respective sensors 145, 135, 130 are shown coupled to the computing system 120 by a preprocessing block 155, then an analog-to-digital converter (ADC) 150. The preprocessing block 155 provides the functions of data filtering, data scaling and time synchronization. Time synchronization is generally needed during measurement and for control. The time synchronization in the preprocessing block 155 is mainly used for the data provided by the respective sensors to be in alignment with respect to time and space axes, which sometimes is transformed to common coordinates, such as based on polar coordinates or Cartesian coordinates.

The FMPD system 100 including the respective sensors 145, 135, 130 shown in FIG. 1A can all be provided together as a single versatile sensor system (see FIG. 1B described below all contained within a common housing shown as 190). Alternatively, the respective sensors 145, 135, 130 can be provided separately.

The MMW sensor 145 is for emitting high-frequency (short wavelength) radiation and is sensitive to material compositions. The high-frequency/short wavelength enables a relatively small size antenna(s). The operating frequency for the MMW sensor 145 is generally 24 GHz to 300 GHz, where 24 GHz is sometimes also called MMW or quasi-MMW. The bandwidth of the MMW sensor 145 is generally >10% of its center frequency, such as >30 GHz in the particular case of a center frequency of 300 GHz. The MMW sensor 145 provides MMW velocity data used for characterizing the respective materials in a fluid mixture including for the computing system 120 to measure the concentration of the fluid mixtures' various component materials shown in FIG. 1A as a composition concentration analyzer 108.

The computing system 120 is also shown providing for the fluid mixture a measure of its complex permittivity, density, moisture content, fluid pressure, fluid temperature, volumetric flow, mass flow, total energy, as well as an in-line chromatograph and fluid quality analyzer 104.

The rectangular box portion of the MMW sensor 145 shown in FIG. 1A generally comprises a controller such as a microcontroller, a digital signal processor (DSP), a transmitter, and a receiver. The MMW sensor 145 also includes at least one antenna shown as first and second triangles identified as $A_1$ and $A_2$ in FIG. 1A that are configured as an antenna pair. As known for MMW sensors, the transmitter includes a phase lock loop (PLL), a frequency sweep controller and power amplifier, and the receiver includes a mixer and low noise amplifier (LNA).

With advances in high-frequency semiconductor technology, a miniaturized system-on-a-chip (SoC) may be commercially available for the MMW sensor 145, such as provided by Texas Instruments Incorporated. The MMW sensor 145 as noted above can provide a bandwidth of 30 GHz and 300 GHz, which makes it possible to perform relatively sophisticated characterizations using a scattering matrix, polarization, frequencies, phases and amplitude signatures of gases, also liquid and solids. Microwaves utilized by the MMW sensor 145 is recognized to be a reliable nondestructive testing (NDT) technique for material moisture sensing and fluid concentration measurements.

The MMW velocity data provided by the MMW sensor 145 is used by the computing system 120 with a database shown as material models and parameters block 125, with an example material model data in the table of material composition properties shown in FIG. 3 described below, to enable detecting the respective components known to be in the fluid mixture. Another material identification method is to use a calibration on the characteristics and the components to be looked for that are not known to be in the fluid mixture, and then to perform classification and material identification for the previously unknown components. In the case the fluid mixture is natural gas, the respective materials can include the known materials to be in natural gas including moisture and the main hydrocarbon gas composition components (e.g., mainly methane ($C_1$), $C_2$, $C_3$ and $C_4$ all shown in FIG. 3 described below).

During operation of the MMW sensor 145, MMW's emitted by one of the antennas such as $A_1$ functioning as a transmit antenna passes through the fluid mixture before reaching the other antenna such as $A_2$ which functions as a receive antenna. The velocity of the MMW's can be determined from the travel time between $A_1$ and $A_2$, where the signal shape, signal width and the frequency of the MMW's are changed by the presence of the fluid mixture. Different fluid mixture compositions will result in different influences, where the higher relative permittivity and/or permeability of the fluid medium, the lower the speed of MMW waves travelling through it.

The ultrasonic sensor 130 measures fluid parameters including the velocity of the fluid mixture and the VoS, which is also known as the speed of sound in the fluid (SoS). The VoS is primarily impacted by respective materials in the fluid mixture, by the temperature, and by the pressure. The ultrasonic sensor 130 also provides raw data to the computing system 120, where the computing system 120 generally uses dedicated algorithms to generate signal signatures including a shape, amplitude, and a phase of the received raw data signal.

A pressure sensor and a temperature sensor are standard features provided by a conventional ultrasonic sensor. Pressure and temperature readings from the fluid pressure and temperature meters 107 are used by the ultrasonic sensor 130 to convert measured real-time volume to a standard volume, with this conversion usually performed by an electronic volume corrector (EVC) as part of the ultrasonic sensor 130. Although an ultrasonic flow meter 130 generally has an integrated EVC, other turbine type flow meters and rotary flow meters generally use a separate EVC.

$T_1$ and $T_2$ of the ultrasonic flow meter 130 are shown in FIG. 1A being on opposite sides of the pipeline 180, each being generally configured to send or receive high-frequency ultrasonic pulses that pass through the fluid mixture. The rectangular box shown as ultrasonic sensor 130 in FIG. 1A includes a controller as well as a transmitter and a receiver, and generally also a multiplexer connecting the Tx and Rx so that at any given time one transducer transmits, and the other transducer receives, and vice versa. Excitation pulses are generated in transmitter chain, and there is generally also an automatic gain control (AGC) in the transmitter chain.

As known in the art of ultrasonic sensing, other transducer arrangements are also possible, such as the first and second transducers $T_1$ and $T_2$ being both positioned on the same side of the pipeline 180, as well as more than two transducer ultrasonic sensing arrangements. There can also be a reflective path arrangement where the first and the second transducers $T_1$ and $T_2$ can be on the same side of the pipeline 180.

Regarding the sensor and respective sensing technologies for the ultrasonic sensor 130, while generally operating at a relatively low frequency of a few hundred kHz, ultrasound can be used in flow velocity measurements, and because the SoS is largely affected by material compositions different materials and fluid mixtures will lead to different SoS. The ultrasonic sensor 130 in one arrangement operates at a frequency of 100 kHz to 2 MHz. The operating frequency range for the ultrasonic sensor 130 may be, for example, from 100 kHz to 400 kHz for gaseous fluids, and may be from 400 kHz to 2 MHz for liquid fluids.

The FBG sensor 135 provides a fiber-optic based spectrometer which operates by sending light into an optical fiber, where the light reflects back from the FBG(s). Theoretically, there can be one hundred or more FBGs on the same fiber at the same nominal center wavelength. There is generally a plurality of FBGs for the FBG sensor 135, at least in the case of a wavelength division multiplexing (WDM)-based FBG sensor. The reflected light travels back to the FBG's sensor's 135 photodetectors and is compared to wavelength reference artifacts so that the FBG sensor 135 can determine the position of the center wavelength of the FBG. Wavelength information is converted to engineering units, for example, 1.3 picometers of wavelength shift can correspond to 1 unit of microstrain. The actual translation is given by the gage factor is generally supplied with the FBG sensor 135.

WDM is a technology which originated from the telecommunication industry which uses multiple optical signals launched onto a single optical fiber by combining different wavelengths (i.e., colors) of light into the optical fiber. In this case of optical fiber sensing it describes the use of FBGs with different reflection wavelengths (Bragg wavelengths) in one optical fiber. The FBG sensor 135 can also utilize time division multiplexing (TDM), which uses the known speed of light in the fiber to determine which signal is reflected from which FBG along the fiber path. TDM can simplify the interrogation for the same wavelength with time delays, so that the combination of WDM and TDM can also be used.

The FBG sensor 135 can provide high accuracy because using WDM (or WDM together with TDM) for the FBG sensor 135 enables sensing the specific wavelength reflection from deformation of its FBG's resulting from humidity, temperature, or strain/pressure changes. The FBG sensor 135 may operate at a frequency in the middle infrared and near infrared. For example, at 37 THz to 400 THz for an Erbium-Doped Fiber Amplifier (EDFA)-based FBG sensor 135 that may operate at a power level of 20 to 24 dB (representing the amplification value of optical power), and at a frequency of 192 THz to 196 THz, corresponding to a wavelength of 1530 nm to 1562 nm.

By combination of at least two different measuring principles and wave types (e.g., electromagnetic waves provided by the MMW sensor 145 and mechanical waves provided by the ultrasonic sensor 130), disclosed aspects recognize sophisticated multi-parameter-based modelling can be realized by utilizing ANN/AI learning implemented by the ANN/AI block 127. In addition, FBG sensors 135 can perform fiber optics-based sensing of spectroscopic signatures to refine the above results (and provide additional parameter information, by collecting reflective and refractive characteristics at different wavelengths that are related to material property, and processing this data to act as a spectroscope.

As noted above, the computing system 120 generates a plurality of fluid parameters. Each of these fluid parameters can be enabled/disabled by an operator using firmware configured for the enabling/disabling function. Regarding the composition concentration, this includes the concentration of compositions known to be in the fluid mixture, and also the concentration of unexpected detected materials by using a known database, such as by utilizing complex relative permittivity and density data. The density parameter shown in FIG. 1A can be implemented by the computing system 120 using a molar mass divided by molar volume, where an ideal gas for molar volume is known as to be 0.0227 $m^3$/mol at 0° C. and 100 kPa, 0.02479 $m^3$/mol at 25° C. and 100 kPa according to the ideal gas equation.

The moisture content shown in FIG. 1A can be implemented by using data from coated FBG sensors, where the coating is selected to make the FBG sensor sensitive to humidity. Fluid pressure and temperature can be provided by the ultrasonic sensor 130. A volumetric flow can also be implemented using data from the ultrasonic sensor 130 that measures the path VoG to further calculate the average velocity across the cross-sectional area of the pipeline 180, where the ultrasonic sensor 130 through its measurement of flow velocity can then be multiplied by the cross-sectional area of the pipeline 180 to obtain the flow rate of the fluid mixture, mass flow (which is calculated as the flow density multiplied by the flow volume), and the energy content implemented by the computing system 120 by taking into account the measured compositions and their mole percentages as a concentration including $C_1$ to $C_4$ (butane) for natural gas that can be used to calculate calorific (energy) values.

The caloric (energy) calculation is a standard calculation when using a conventional gas chromatograph. The inline chromatograph and fluid quality analyzer shown in FIG. 1A is implemented by the computing system 120 by knowing information for either a fluid quality inspection or a main useful compositions inspection. For example, the water or humidity level in natural gas should be as low as possible. Similarly, the level of toxic gases such as $H_2S$ should be less than tens of ppm according to regulations of different countries, as well as for carbon dioxide, methane, etc., and by identifying components present in fluid mixture to ensure heat values, as well as the compliance of environmental regulations.

Sensor data diagnosis, calibration and fusion block 124 is for putting the respective data together from the respective sensors, which can be used to determine models for pattern recognition. ANN/AI learning block 127 can be used to establish multi-sensor fusion models in vector space using sensed signatures generated by the signature extraction block 123 from data provided by the MMW sensor 145, the ultrasonic sensor 130, and optionally also the FBG sensor 135.

Figure 1B:
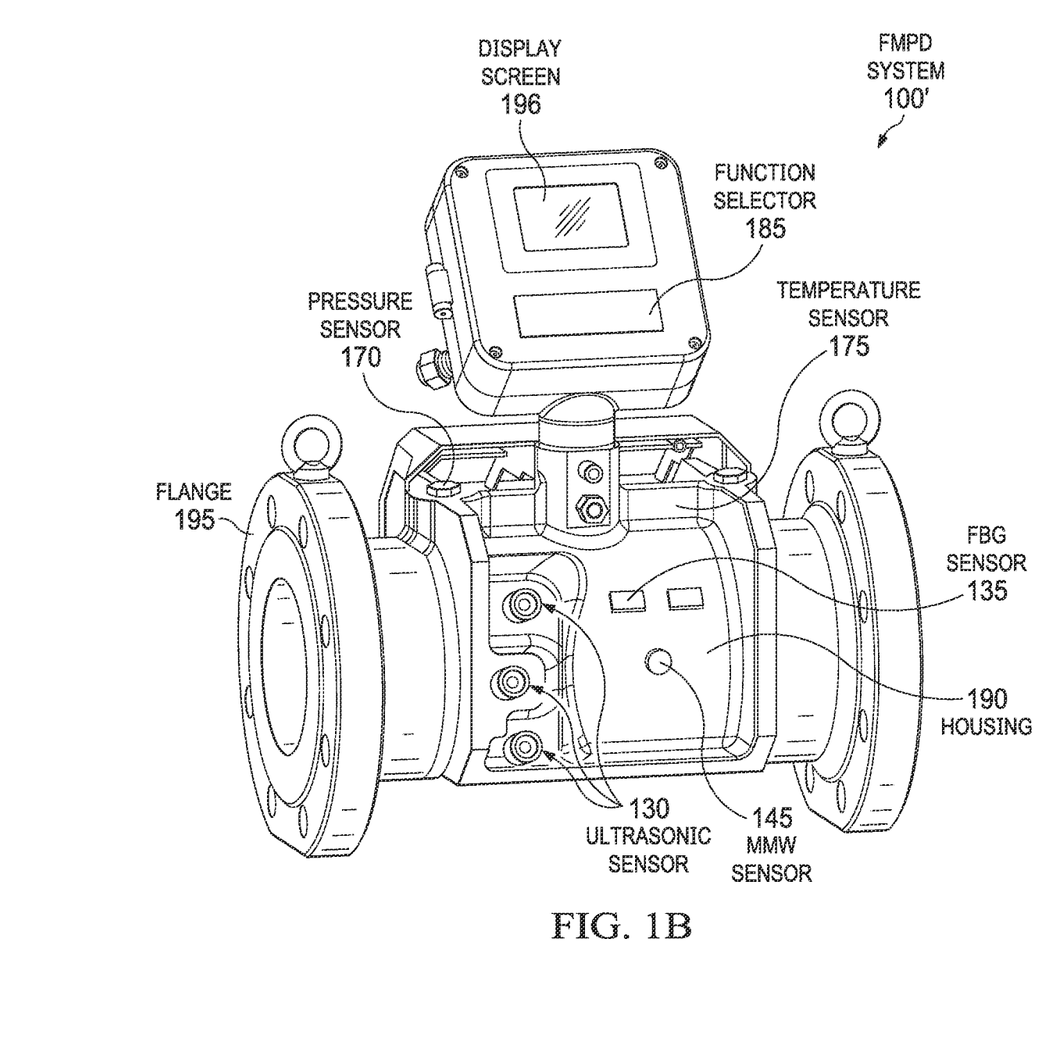
FIG. 1B shows the FMPD system shown in FIG. 1A now within a common housing, together with mounting flanges on its ends, as well as a function selector switch, and a display screen.

FIG. 1B shows the FMPD system 100 shown in FIG. 1A now shown as FMPD system 100' now within a common housing 190, together with mounting flanges 195 on its respective ends are mounting to a pipeline. FMPD system 100' is shown further comprising a function selector switch 185, and a display screen 196. The flanges 195 include the holes shown to enable bolting onto an adjacent section of a pipeline as with a conventional flow meter, where a piece of spool can be inserted between pipes with flanges 195 to be bolted on. Example locations are shown for controlling the orientation of the ultrasonic sensor 130, MMW sensor 145, and the FBG sensor 135. FMPD system 100' may also include other sensors.

Figure 2:
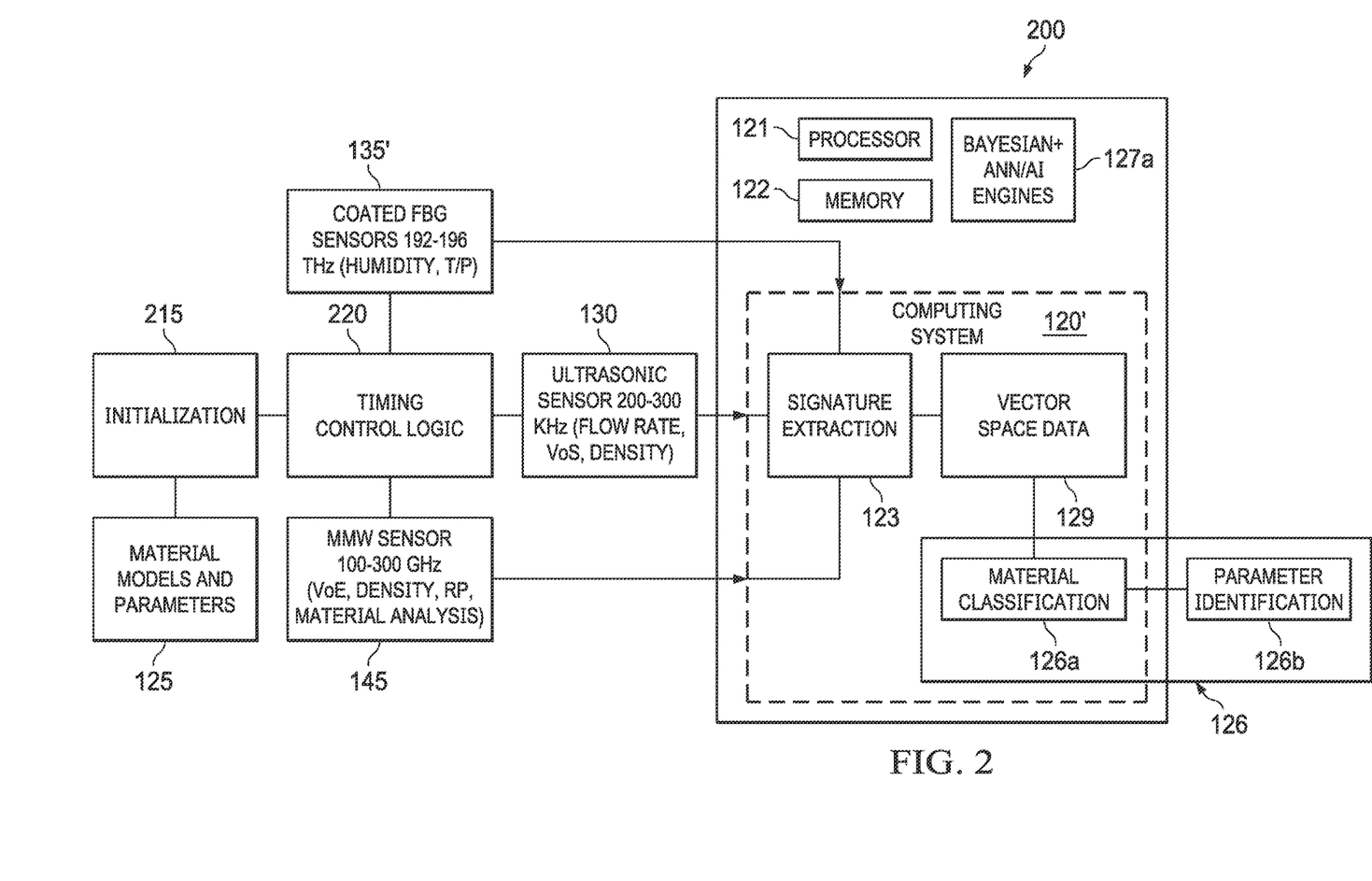
FIG. 2 shows an example data processing flowchart for determining a plurality of fluid parameters for a flowing fluid mixture using a disclosed FMPD system.

FIG. 2 shows an example data processing flowchart 200 for determining a plurality of fluid parameters for a flowing fluid mixture, where as noted above a FBG sensor is optional, that is now shown as coated FBG sensors 135' that can implement WDM. Sensor data shown provided by the coated FBG sensor 135, ultrasonic sensors 130, and MMW sensor 145 are all coupled (by ADC 150 then the preprocessing block 155, shown in FIG. 1) to a computing system now shown as 120' that implements Bayesian classification analysis along with an ANN/AI engine 127a.

The signature extraction block 123 of the computing system 120' performs signature extractions using the respective sensor data received from the three sensor types shown, which is then processed into vector space data 129, which is then classified by the material parametric classification and identification block 126 shown separately as material classification block 126a, and an parameter identification block 126b which provides the identification of a plurality of fluid parameters, such as those shown in FIG. 1A described above.

The data processing flowchart 200 is also shown including the materials models and parameter block 125 also shown in FIG. 1A, for training the samples or for loading a database. The timing control logic 220 is for coordinating the timing of the respective measurements, acquired measured data and calculations, and any deemed necessary control time sequences. The measurements are generally from the ultrasonic sensor 130 (ultrasonic path measurements), from the MMW sensor 145 (MMW velocity measurements), and from the coated FBG sensor 135'.

Regarding the determination of the compositions present in the fluid mixture in the case of a gas mixture, one having ordinary skill in the art can utilize different related equations developed by using this Disclosure for the determination of components in a liquid mixture as well, the VoS in a gas is affected by the gas compositions. A relationship for VoS can be expressed as follows:

$$VoS = \sqrt{\frac{C_p}{C_v} \frac{RT}{M_r}\left(Z + \rho\left(\frac{\partial Z}{\partial \rho}\right)_T\right)}$$

Where $M_r$=composition density (g/mol), $Z$=a gas compressibility factor, $\rho$=Molar density, $\partial$ represents a partial derivative, $C_p/C_v$ is ratio of constant volume and constant pressure heat capacities of the gas. R=universal gas constant=8.31446261815324 $JK^{-1}$ $mol^{-1}$. T is the temperature expressed in Kelvin. The Molar density (Mr) can be expressed as:

$$M_r = \left(\frac{C_p}{C_v} \frac{RT}{VoS^2}\left(Z + \rho\left(\frac{\partial Z}{\partial \rho}\right)_T\right)\right)$$

Figure 3:
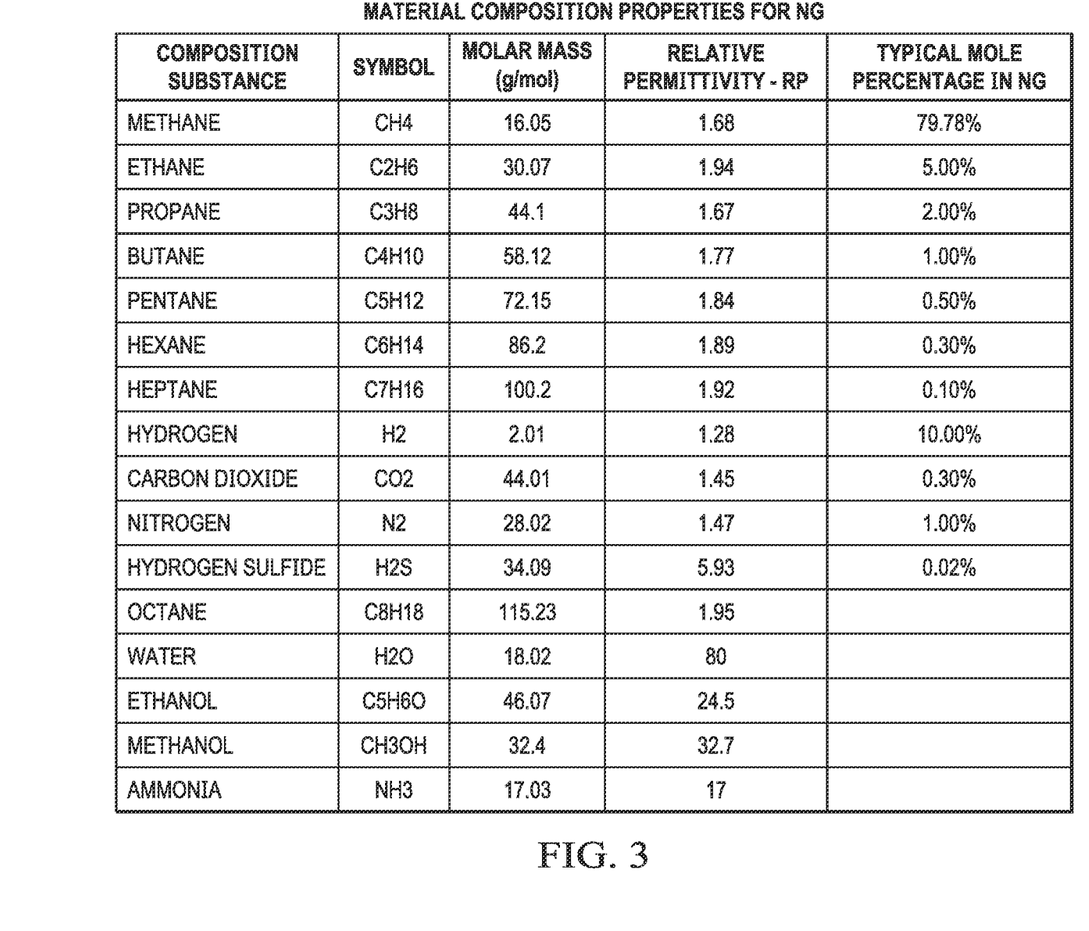
FIG. 3 is an example table showing material composition properties for a plurality of component materials including those that are generally included in natural gas shown as NG.

Since the main gas compositions in natural gas have different molar mass (molecular weight) and VoS, the signatures from the ultrasonic sensor 130 can be used for identification and classification of the respective components in the gas mixture as shown in the Table in FIG. 3 which are shown in the column for molar mass. The material permittivities may also be determined. The velocity of the MMW (shown as VoE in the equation below) is affected by the permittivity and permeability of the medium in which the MMW's travel.

$$VoE = \frac{C_0}{\sqrt{\epsilon_r \mu_r}}$$

Where $C_0$ is VoE (the same velocity as the speed of light) in a vacuum=$3\times10^8$ m/s, $\epsilon_r$=material relative permittivity (RP), and $\mu_r$=its relative permeability.

$$\epsilon_r = \frac{C_0^2}{VoE^2 \mu_r}$$

Likewise, the main gas compositions in natural gas have a different relative permittivity (RP) which changes the velocity of the MMW's. The frequency signatures can be used for identification of the molar mass of the respective compositions in the fluid mixture and thus their identity, as shown in FIG. 3 which provides a table with a column RP having RP values for known components of natural gas. Different gas/liquid sources in the supply chain can have different percentages of these components, so that the numbers in the RP column show an indication that is not directly taken from public sources, rather being than estimate generated based on several factors. For example, the methane concentration generally varies from 70% to 90% for natural gas.

EXAMPLES

Disclosed aspects are further illustrated by the following specific Examples, which should not be construed as limiting the scope or content of this Disclosure in any way.

Figure 4:
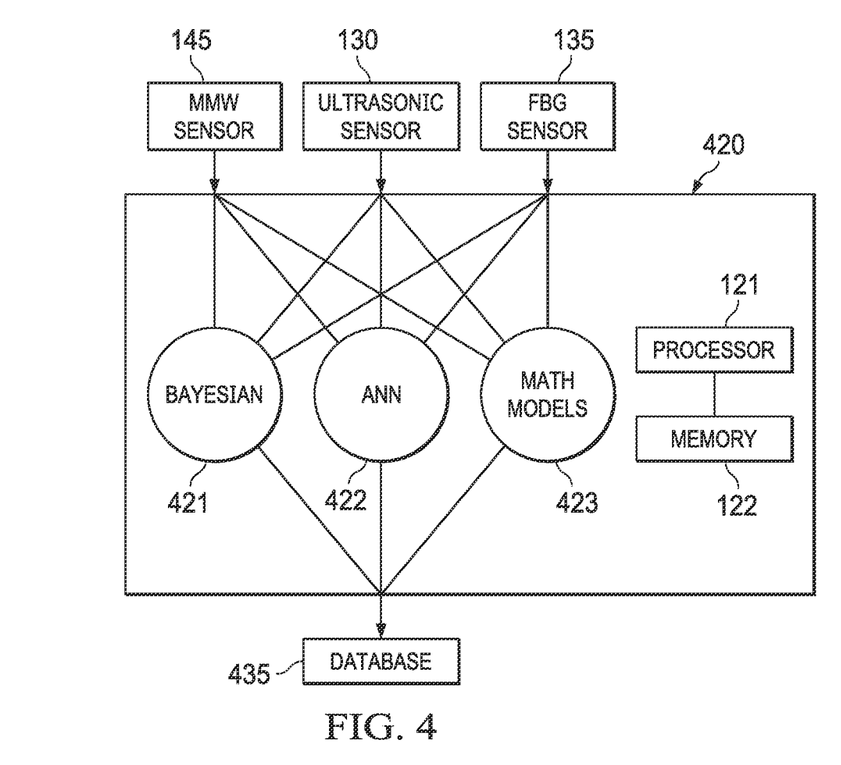
FIG. 4 shows an example of a disclosed data fusion arrangement, where data from a MMW sensor, an ultrasonic sensor, and an FBG sensor are all processed together by a computing system that implements a Bayesian classification block, an artificial neural network (ANN) engine, and mathematical models.

FIG. 4 shows an example of a disclosed data fusion arrangement, where data from a MMW sensor 145, and ultrasonic sensor 130, and a FBG sensor 135 are all processed together by a computing system shown as 420 comprising a processor 121 and memory 122 that implements a Bayesian classification block 421, an ANN engine 422, and mathematical models block 423, such as described above in the equations provided, and statistical models such as probability distribution, and frequency spectrum component distribution. Data from each of the sensors 145, 130 and 135 is shown coupled to each of the Bayesian classification block 421, ANN engine 422, and the mathematical models block 423. Respective outputs from the Bayesian classification block 421 outputs vectors of features extracted from raw data, ANN engine 422 outputs abstract models, and mathematical models 423 that are updated mathematical models which include coefficients, that are each shown stored in a database shown as 435.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

The invention claimed is:

1. A fluid mixture parameter determination (FMPD) system for analyzing a fluid mixture while moving, comprising:
a computing system including a processor and an associated memory, and at least one material model that includes two or more model parameters for a plurality of material compositions stored in the memory;
an ultrasonic sensor and a millimeter wave (MMW) sensor each coupled to sense the fluid mixture and each being coupled to the computing system;
the ultrasonic sensor for providing ultrasonic data to the computing system including at least a velocity or a volumetric flow of the fluid mixture, and a velocity of sound (VoS) through the fluid mixture;
the MMW sensor for providing MMW velocity data to the computing system,
wherein the computing system is for utilizing the material model together with the ultrasonic data and the MMW velocity data for identifying parameters including a plurality of components in the fluid mixture and a concentration for the plurality of components.

2. The FMPD system of claim 1, wherein the ultrasonic data comprises raw data that the computing system uses to determine a shape, amplitude, and a phase.

3. The FMPD system of claim 1, wherein the computing system implements an artificial neural network (ANN) engine or an artificial intelligence (AI) engine configured for dynamically updating the material model.

4. The FMPD system of claim 1, wherein the MMW sensor has a central frequency between 30 GHz and 300 GHz, and a bandwidth of at least 10% of the center frequency.

5. The FMPD system of claim 1, further comprising a Fiber Bragg Grating (FBG) sensor that utilizes wavelength division multiplexing (WDM) coupled to sense the fluid mixture which is coupled to the computing system, wherein the FBG sensor comprises a coated FBG sensor configured for sensing a humidity in the fluid mixture traveling over the FBG sensor or over the fluid mixture.

6. The FMPD system of claim 1, wherein the computing system is further for determining a density and an energy content of the fluid mixture.

7. The FMPD system of claim 1, wherein the FMPD system is all contained within a common housing.

8. The FMPD system of claim 1, wherein the computing system further implements a signal extraction module, a sensor data fusion module, and a material parametric classification and identification module.

9. A method, comprising:
providing a fluid mixture parameter determination (FMPD) system comprising a computing system including a processor and an associated memory, and at least one material model that includes two or more model parameters for plurality of material compositions stored in the memory, an ultrasonic sensor and a millimeter wave (MMW) sensor each coupled to the computing system and each coupled to sense a fluid mixture while the fluid mixture is moving;
the ultrasonic sensor providing ultrasonic data including at least a velocity of the fluid mixture or a volumetric flow of the fluid mixture to the computing system, and a velocity of sound (VoS) through the fluid mixture;
the MMW sensor sensing MMW velocity data and providing the MMW velocity data to the computing system, and
the computing system utilizing the material model together with the ultrasonic data and MMW velocity data for identifying parameters including a plurality of components in the fluid mixture and a concentration for the plurality of components.

10. The method of claim 9, wherein the fluid mixture is moving through a pipeline, and wherein the coupled to sense the fluid mixture comprises the FMPD system being coupled to the pipeline for in-line determination of the plurality of components in the fluid mixture and the concentration for the plurality of components.

11. The method of claim 9, wherein the computer system implements at least one of an artificial neural network (ANN) engine and an artificial intelligence (AI) engine, further comprising the ANN engine or the AI engine updating the material model.

12. The method of claim 9, wherein the MMW sensor has a central frequency between 30 GHz and 300 GHz, and a bandwidth of at least 10% of the center frequency.

13. The method of claim 9, wherein the FMPD system further comprising a Fiber Bragg Grating (FBG) sensor that utilizes wavelength division multiplexing (WDM) coupled to sense the fluid mixture and coupled to the computing system, wherein the FBG sensor comprises a coated FBG sensor, further comprising the coated FBG sensor sensing a humidity in the fluid mixture.

14. The method of claim 9, wherein the computing system further determines a density of the fluid mixture and an energy content of the fluid mixture.

15. The method of claim 9, wherein the fluid mixture comprises natural gas.

16. The method of claim 9, wherein the computing system further implements a signal extraction module, a sensor data fusion module, and a material parametric classification and identification module.

17. The method of claim 9, wherein the FMPD system further comprises a function selector configured for the enabling or disabling individual ones of the parameters, and wherein the method further comprises a user of FMPD system using the function selector for the enabling or disabling the individual ones of the parameters.

* * * * *